United States Patent
Shijo et al.

(10) Patent No.: US 9,444,300 B2
(45) Date of Patent: Sep. 13, 2016

(54) CORE WINDING METHOD AND STATOR (75) Inventors: Daisuke Shijo, Chiyoda-ku (JP);
Takahiro Tanaka, Chiyoda-ku (JP);
Hiroyuki Akita, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 448 days.

(21) Appl. No.: 14/006,449

(22) PCT Filed: Mar. 23, 2011

(86) PCT No.: PCT/JP2011/057008
§ 371 (c)(1),
(2), (4) Date: Sep. 20, 2013

(87) PCT Pub. No.: WO2012/127658
PCT Pub. Date: Sep. 27, 2012

(65) Prior Publication Data
US 2014/0009028 A1    Jan. 9, 2014

(51) Int. Cl.
*H02K 1/00* (2006.01)
*H02K 3/46* (2006.01)
(Continued)

(52) U.S. Cl.
CPC .............. *H02K 3/46* (2013.01); *H02K 3/522* (2013.01); *H02K 15/0435* (2013.01); *H02K 15/095* (2013.01); *H02K 15/0081* (2013.01); *H02K 2203/12* (2013.01); *Y10T 29/49009* (2015.01)

(58) Field of Classification Search
CPC .......... H02K 15/095; H02K 15/0435; H02K 2203/12; Y10T 29/49009; Y10T 29/49071; Y10T 29/49073

USPC ................... 310/179–180, 194; 29/596, 598
See application file for complete search history.

(56) References Cited

U.S. PATENT DOCUMENTS 4,520,965 A    6/1985    Kimura et al.
5,703,426 A *  12/1997   Ueno ..................... H02K 1/148
                                                  29/596

(Continued)

FOREIGN PATENT DOCUMENTS

JP    59-28857 A     2/1984
JP    10-136620 A    5/1998

(Continued)

OTHER PUBLICATIONS

Second Notice of Reasons for Rejection issued on Feb. 3, 2016, by the Chinese Patent Office in corresponding Chinese Patent Application No. 201180069482.0, and English translation of the Office Action. 14 pages).

(Continued)

*Primary Examiner* — Thanh Lam
(74) *Attorney, Agent, or Firm* — Buchanan Ingersoll & Rooney PC (57) ABSTRACT

In a method for winding a core having an arch-like yoke portion, a tooth portion, and a tooth end portion by revolving a nozzle for feeding a conductive wire, when winding is performed in a bow-like area surrounded by an inner circumferential arc of the yoke portion and the chord thereof, upon winding on an end surface of the core, the nozzle moves so as to draw a convex-shaped trajectory proceeding from the tooth end portion side toward the yoke portion side with reference to the chord of the bow-like area, and upon winding on a side surface of the core, the nozzle returns from the yoke portion side to the tooth end portion side with reference to the chord of the bow-like area, and then moves along the side surface of the core.

9 Claims, 13 Drawing Sheets

(51) Int. Cl.
   *H02K 15/095* (2006.01)
   *H02K 15/04* (2006.01)
   *H02K 3/52* (2006.01)
   *H02K 15/00* (2006.01)

(56) References Cited

U.S. PATENT DOCUMENTS

| | | | |
|---|---|---|---|
| 8,013,490 B2* | 9/2011 | Hino | H02K 3/34 |
| | | | 310/194 |
| 8,058,766 B2* | 11/2011 | Hoshino | H02K 3/522 |
| | | | 310/179 |
| 2003/0011269 A1 | 1/2003 | Takano et al. | |
| 2005/0212378 A1* | 9/2005 | Wang | H02K 1/148 |
| | | | 310/260 |
| 2006/0022550 A1 | 2/2006 | Otsuji | |
| 2007/0182271 A1* | 8/2007 | Sugishima | H02K 1/148 |
| | | | 310/216.012 |
| 2008/0042512 A1* | 2/2008 | Otsuji | H02K 3/325 |
| | | | 310/216.113 |
| 2010/0066197 A1* | 3/2010 | Futami | H02K 1/146 |
| | | | 310/208 |

FOREIGN PATENT DOCUMENTS

| | | |
|---|---|---|
| JP | 2000-083357 A | 3/2000 |
| JP | 2002-112512 A | 4/2002 |
| JP | 2003-032935 A | 1/2003 |
| JP | 2005-229703 A | 8/2005 |
| JP | 2006-067778 A | 3/2006 |
| JP | 2007-043840 A | 2/2007 |
| JP | 2008-228471 A | 9/2008 |

OTHER PUBLICATIONS

Office Action (Notice of Reasons for Rejection) issued on Jun. 17, 2014, by the Japanese Patent Office in corresponding Japanese Patent Application No. 2013-505727 and partial English translation of the Office Action. (6 pages).

Office Action (Notice of Opinion on Examination) issued on Mar. 3, 2014, by the Taiwanese Patent Office in corresponding Taiwanese Patent Application No. 100128128, and an English Translation of the Office Action. (13 pages).

Chinese Office Action issued on Jun. 3, 2015, by the Chinese Patent Office in corresponding Chinese Patent Application No. 201180069482.0, and an English Translation of the Office Action. (16 pages).

International Search Report (PCT/ISA/210) mailed on Jun. 21, 2011, by the Japanese Patent Office as the International Searching Authority for International Application No. PCT/JP2011/057008.

Office Action issued on Aug. 22, 2014, by the Korean Patent Office in corresponding Korean Patent Application No. 10-2013-7024051 and an English translation of the Office Action. (15 pages).

Office Action (Decision of Patent Rejection) issued on Sep. 18, 2015, by the Korean Patent Office in corresponding Korean Patent Application No. 2013-7024051, and an English translation of the Office Action. (6 pages).

Japanese Office Action dated Feb. 24, 2015 issued in corresponding Japanese Patent Appln No. 2013-505727, with English translation (5 pages).

Office Action (Notice of Opinion Submission) issued on Mar. 13, 2015, by the Korean Patent Office in corresponding Korean Patent Application No. 2013-7024051, and an English Translation of the Office Action. (8 pages).

* cited by examiner

CORE WINDING METHOD AND STATOR

TECHNICAL FIELD

The present invention relates to a core winding method for winding a conductive wire on a core having an arch-like yoke portion and a tooth portion protruding radially inward from the center portion of the yoke portion, and to a stator manufactured by the core winding method.

BACKGROUND ART

In order to increase the number of turns of a conductive winding, a yoke portion of a core may be formed in an arch-like shape and a conductive wire may be wound in a bow-like area surrounded by an arc of the inner circumference of the yoke portion and a chord connecting both ends of the arc, thereby increasing the area for storing the conductive winding.

In a normal core winding method, upon winding in the bow-like area surrounded by the arc of the inner circumference of the arch-like yoke portion and the chord of the arc, since a nozzle interferes with the yoke portion, the tip of the nozzle cannot be made to approach a tooth portion, and as a result, the winding cannot be placed with a high positional accuracy. Therefore, it is difficult to wind the conductive wire on the core with a high occupancy.

Considering the above, as a method for placing a conductive winding in the above bow-like area in an aligned manner, a method of winding a wire while sequentially inclining a nozzle is disclosed (for example, see Patent Document 1).

In the above winding method for a divided core shown in Patent document 1, an angle θ of the nozzle with respect to a center plane passing through the centers of a yoke portion, an iron core portion, and a magnetic pole piece, is set so as not to cause the nozzle and the divided core to interfere with each other when a conductive wire is wound on the side surface (a lamination surface of steel plates composing the divided core or a surface along the lamination direction of the steel plates) of the iron core portion of the divided core. Then, a conductive wire is wound on the iron core portion so as to fill a space formed between the yoke portion and the magnetic pole piece, thereby forming a winding portion.

CITATION LIST

Patent Document

Patent Document 1: Japanese Laid-Open Patent Publication No. 10-136620 (paragraph [0024] and FIG. 1)

SUMMARY OF THE INVENTION

Problems to be Solved by the Invention

In the above conventional winding method for a divided core, in order to deal with various shapes of cores, an operation section for the nozzle of a winding apparatus needs to have a mechanism for moving the nozzle not only in the directions of mutually orthogonal three axes (x axis, y axis, and z axis) but also in a θ axis direction for inclining the nozzle, thereby causing a problem of increasing the size of a facility and the facility cost.

In addition, since a needed operation range of the nozzle is large, it is difficult to apply the conventional winding method to a joined-type core or an integrated-type core which has a greater restriction of the operation range of the nozzle than the divided-type core.

Further, in the case of winding a conductive wire on a plurality of tooth portions continuously without cutting the conductive wire, in order to ensure the nozzle operation range, a plurality of divided-type cores need to be set with a certain distance provided therebetween in the winding apparatus. Therefore, the length of a jumper conductive wire extending between the adjacent divided-type cores increases more than necessary, and some steps of fixing the position of the jumper conductive wire are added when a stator is assembled by combining the divided-type cores. As a result, a problem of increasing the number of manufacturing steps and the manufacturing cost, arises.

The present invention has been made to solve the above problems, and an object of the present invention is to, by devising the revolving trajectory of the nozzle or the shape of an insulator, make it possible to wind a core having an arch-like yoke portion by using a general-purpose winding machine that moves a nozzle in x-axis, y-axis, and z-axis directions orthogonal to each other, and increase the number of turns of the conductive winding and the occupancy of the conductive winding.

Solution to the Problems

A core winding method according to a first invention is a core winding method for, by revolving a nozzle for feeding a conductive wire, winding the conductive wire on a core having: an arch-like yoke portion; a tooth portion protruding radially inward from the center portion of the yoke portion; and a tooth end portion connected to the end of the tooth portion. The core winding method includes the steps of, in the case of performing winding in a bow-like area surrounded by an arc of the inner circumference of the yoke portion and a chord of the arc: upon winding on an end surface of the core, winding the conductive wire by moving the nozzle so as to draw a convex-shaped trajectory proceeding from the tooth end portion side toward the yoke portion side with reference to the chord of the bow-like area; and upon winding on a side surface of the core, winding the conductive wire by returning the nozzle from the yoke portion side to the tooth end portion side with reference to the chord of the bow-like area, and then moving the nozzle along the side surface of the core.

A stator according to a second invention is a stator formed by winding a conductive wire on a core on which an insulator has been attached and combining a plurality of the cores in a circular shape. The core has: an arch-like yoke portion; a tooth portion protruding radially inward from the center portion of the yoke portion; and a tooth end portion connected to the end of the tooth portion. The insulator has: a winding frame portion positioned at least on an end surface of the tooth portion; a base portion which is positioned at least on an end surface of the yoke portion and whose end surfaces on both sides in the circumferential direction are positioned on the end surface side of the core relative to the end surface of the winding frame portion; and a winding frame end portion positioned at least on an end surface of the tooth end portion. The conductive wire is wound at least in the bow-like area on the core and the winding frame portion of the insulator.

A stator according to a third invention is a stator formed by winding a conductive wire on a core on which an insulator has been attached and combining a plurality of the cores in a circular shape. The core has: an arch-like yoke portion; a tooth portion protruding radially inward from the center portion of the yoke portion; and a tooth end portion connected to the end of the tooth portion. The insulator has: a base portion positioned at least on an end surface of the yoke portion; a winding frame portion positioned at least on an end surface of the tooth portion and having at least one groove for fixing the position of the conductive wire in a bow-like area surrounded by an arc of the inner circumference of the base portion and a chord of the arc; and a winding frame end portion positioned at least on an end surface of the tooth end portion. The conductive wire is wound at least in the bow-like area on the core and the winding frame portion of the insulator.

Effect of the Invention

According to the present invention, a conductive wire can be wound in an aligned manner in a bow-like area of a core having an arch-like yoke portion by using a general-purpose winding machine that moves a nozzle in x axis, y axis, z axis directions orthogonal to each other. Therefore, it becomes possible to increase the number of turns of the conductive winding and the occupancy of the conductive winding, and suppress the facility cost for winding.

DESCRIPTION OF EMBODIMENTS

Embodiment 1

Figure 1:
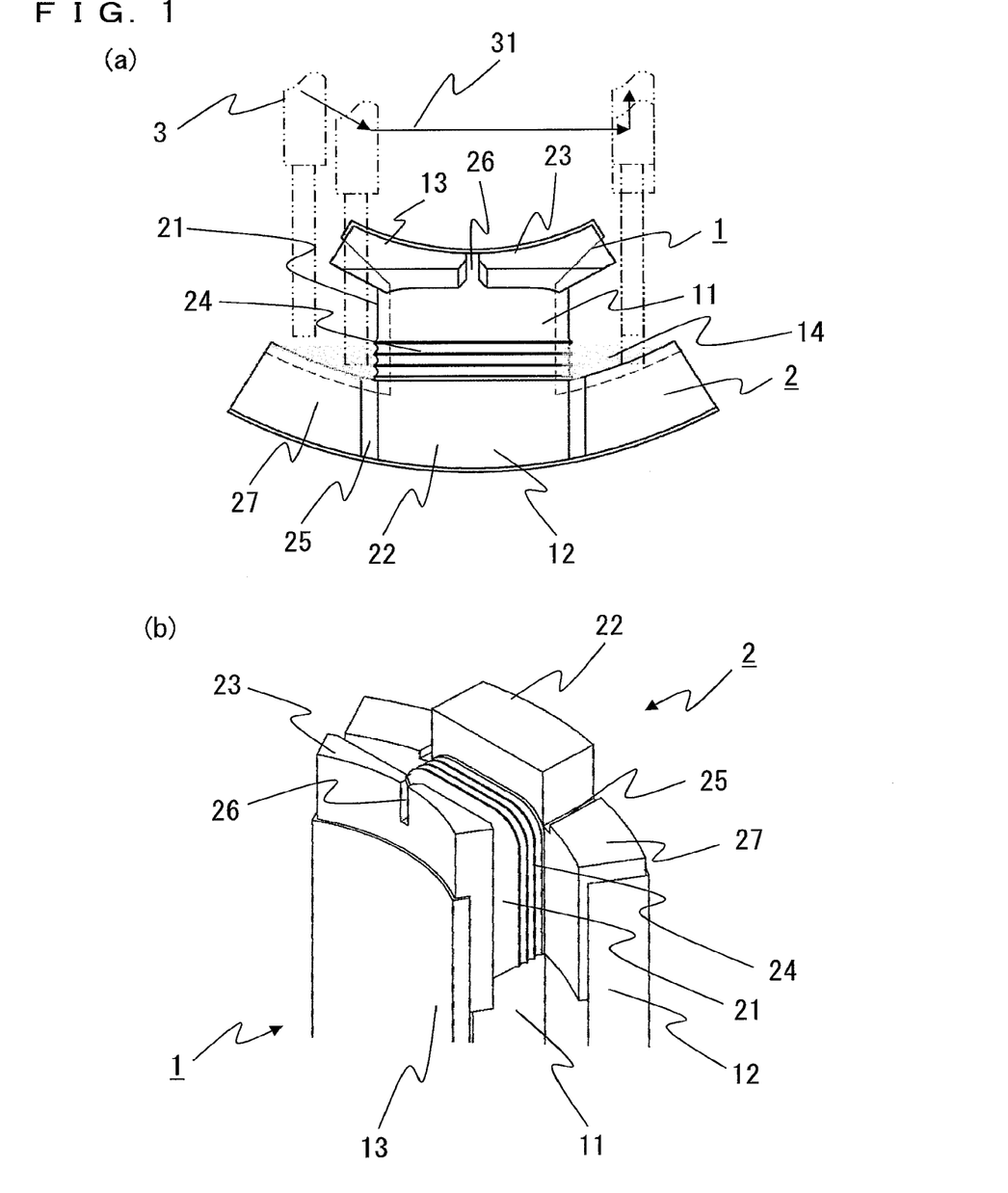
FIG. 1 is a front view and a perspective view showing the shapes of a divided-type core and an insulator according to an embodiment of the present invention.

FIGS. 1(a) and 1(b) are a front view and a perspective view showing the shapes of a divided-type core and an insulator according to an embodiment of the present invention. FIGS. 2 to 8 are diagrams for explaining a core winding method according to embodiment 1 of the present invention.

A divided-type core 1 is formed by punching silicon steel plates or the like in the same shape by using a press mold and then laminating a plurality of the punched steel plates. Welding, bonding, swaging, or the like is used as means for fixing the laminated steel plates. The divided-type core 1 has: an arch-like yoke portion 12 having a radially outward convex shape; a tooth portion 11 protruding radially inward from the center portion of the yoke portion 12 and to be wound with a conductive wire 4; and a tooth end portion 13 connected to the end of the tooth portion 11. The yoke portions 12 of a plurality of the divided-type cores 1 are combined in a circular shape, to form a stator.

In order to ensure electric insulation between the divided-type core 1 and the conductive wire 4, a pair of insulators 2 are attached which have a shape for covering at least respective both end surfaces of the divided-type core 1. As shown in FIG. 1(a), the shape of the insulator 2 as seen from the front of the tooth portion 11 or the yoke portion 12 of the divided-type core 1 is almost equal to the shape of the divided-type core 1 as seen from the front thereof. The insulator 2 has: a winding frame portion 21 positioned at least on an end surface of the tooth portion 11 of the divided-type core 1 and to be wound with the conductive wire 4; a base portion 22 positioned at least on an end surface of the yoke portion 12 of the divided-type core 1; and a winding frame end portion 23 positioned at least on an end surface of the tooth end portion 13 of the divided-type core 1.

The winding frame portion 21 of the insulator 2 has winding grooves 24 for retaining the conductive wire 4 at a certain position, which is provided in a bow-like area 14 surrounded by an arc of the inner circumference of the yoke portion 12 and a chord connecting both ends of the arc and which has a width corresponding to the diameter of the conductive wire 4. In addition, the base portion 22 or the winding frame end portion 23 of the insulator 2 have a base portion side guide groove 25 or a winding frame end portion side guide groove 26, respectively, for guiding the conductive wire 4 at the start of winding. Further, in order to prevent movement of the nozzle 3 from interfering with an end portion of the base portion 22 of the insulator 2 in the circumferential direction, concave portions 27 are provided on both sides of the base portion 22 in the circumferential direction on the end surface of the insulator 2. The concave portions 27 are positioned on the end surface side of the divided-type core 1 relative to the end surface of the winding frame portion 21.

In addition, in FIG. 1(a), a trajectory 31 is shown which indicates a trajectory of the nozzle 3 for winding the conductive wire 4 on the end surface of the divided-type core 1 in a winding process described below.

Next, the core winding method according to the present embodiment will be described based on FIGS. 2 to 8. In each of FIGS. 2 to 8, a diagram (a) on the left side shows a front view of the divided-type core on which the insulator has been attached, as seen from the same direction as in FIG. 1(a), and a diagram (b) on the right side shows a side view of the diagram (a).

In FIGS. 2 to 8, mutually orthogonal three axes of x axis, y axis, and z axis based on the center of the divided-type core 1 are shown for indicating the movement direction of the nozzle 3 for feeding the conductive wire 4. The x axis direction is a direction from the outer circumferential side toward the inner circumferential side of the divided-type core 1, the y axis direction is the width direction (circumferential direction) of the divided-type core 1, and the z axis is a long axis direction of the divided-type core 1. Further, an end surface of the divided-type core 1 on the negative direction side of the z axis is defined as a first end surface, and an end surface of the divided-type core 1 on the positive direction side of the z axis is defined as a second end surface.

Figure 2:
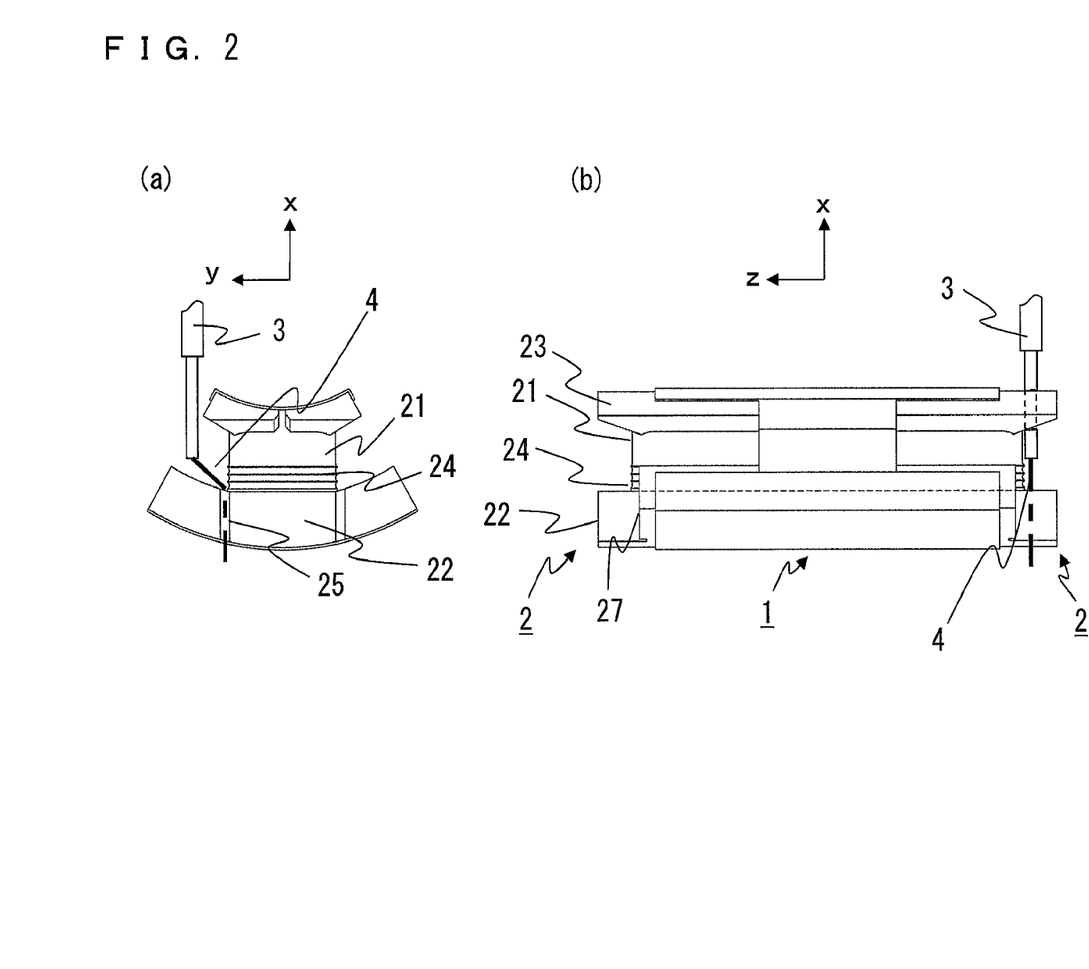
FIG. 2 is a diagram for explaining a core winding method according to embodiment 1 of the present invention.

First, as shown in FIG. 2, the nozzle 3 is positioned on the first end surface which is the end surface of the divided-type core 1 on the negative direction side of the z axis. Then, an end portion of the conductive wire 4 fed from the nozzle 3 is passed through the base portion side guide groove 25 of the insulator 2, and the end portion of the conductive wire 4 is held by a chuck device not shown. Then, the nozzle 3 is moved to a position where the nozzle 3 will not interfere with the divided-type core 1 and the insulator 2 when the nozzle 3 is moved along the side surface of the divided-type core 1 in the positive direction of the z axis.

Figure 3:
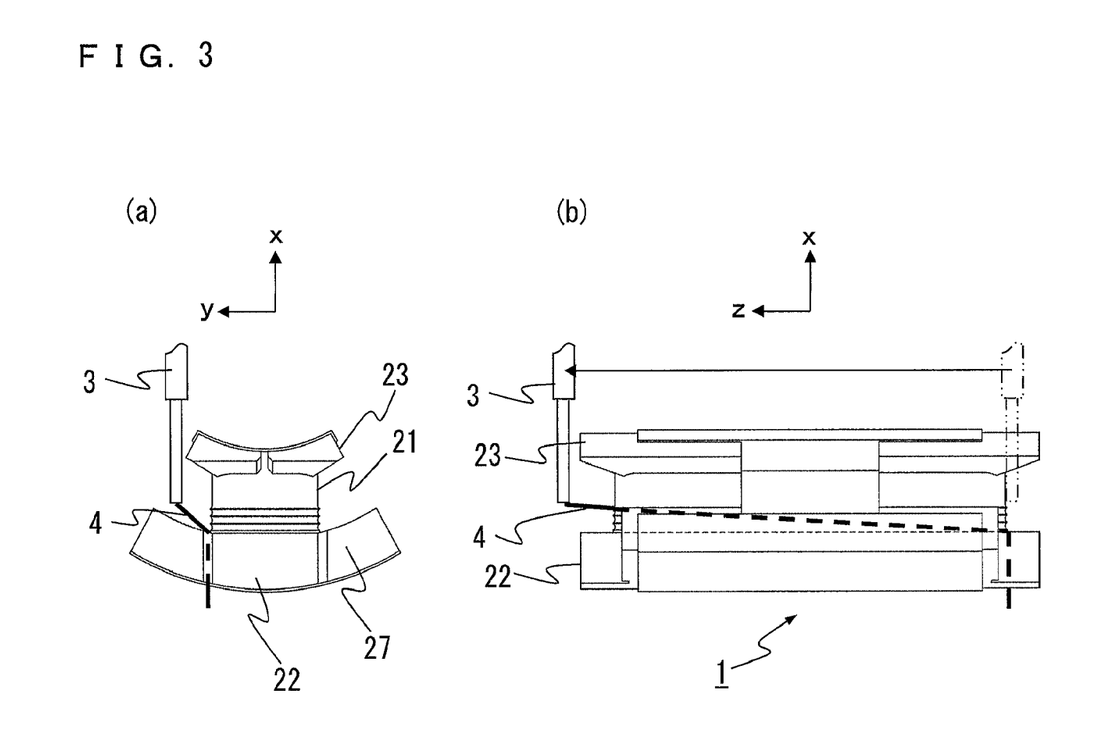
FIG. 3 is a diagram for explaining the core winding method according to embodiment 1 of the present invention.

Next, as shown in FIG. 3, the nozzle 3 is moved substantially linearly along the side surface of the divided-type core 1 in the positive direction of the z axis, to start feeding the conductive wire 4. The nozzle 3 is moved to a position away by a predetermined distance in the positive direction of the z axis from an end surface of the insulator 2 on the second end surface side of the divided-type core 1.

It is noted that in FIGS. 2 and 3, in order not to interfere with the divided-type core 1 and the insulator 2, the nozzle 3 is positioned on the tooth end portion side, i.e., the upper side on the drawing, with reference to the position of the chord of the bow-like area 14.

Figure 4:
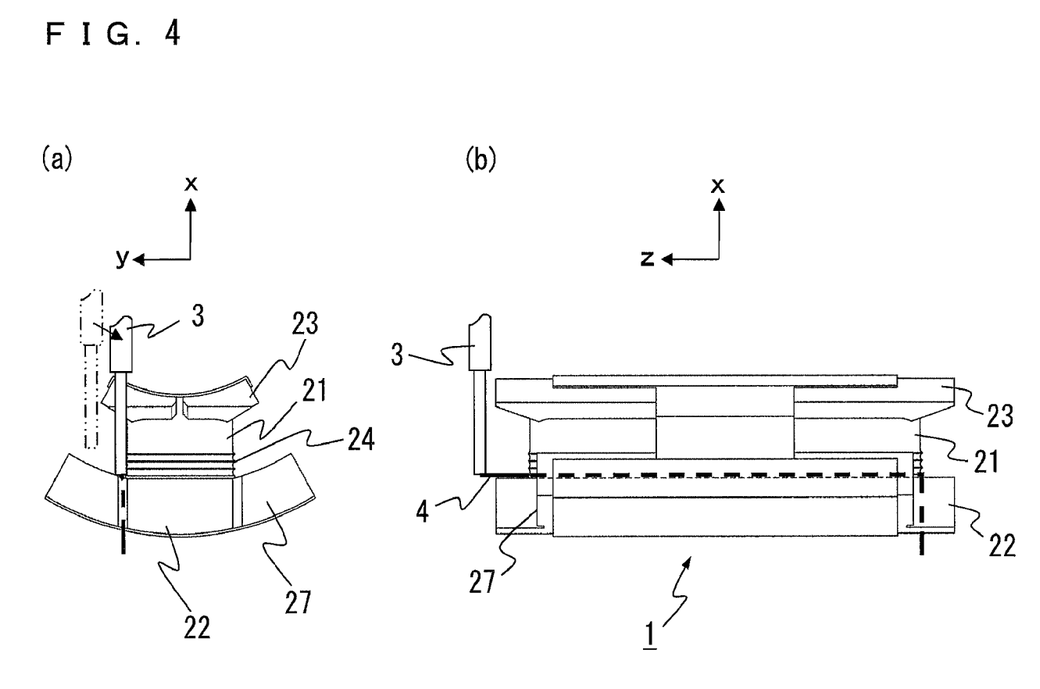
FIG. 4 is a diagram for explaining the core winding method according to embodiment 1 of the present invention.

Next, as shown in FIG. 4, the nozzle 3 is moved so as to place the conductive wire 4 on the winding groove 24 that is closest to the base portion 22 of the insulator 2. At this time, the nozzle 3 is moved toward the yoke portion side, i.e., the lower side on the drawing, with reference to the position of the chord of the bow-like area 14.

Figure 5:
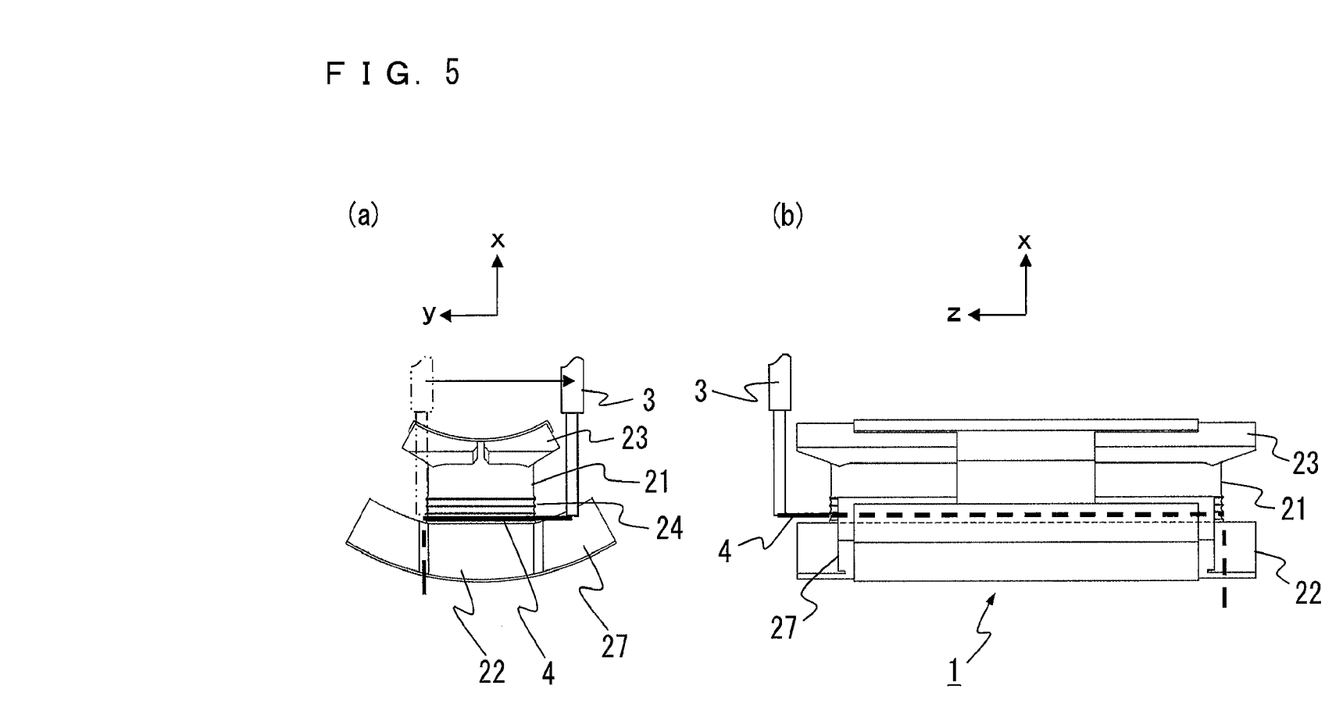
FIG. 5 is a diagram for explaining the core winding method according to embodiment 1 of the present invention.

Next, as shown in FIG. 5, the nozzle 3 is moved in the negative direction of the y axis, thereby inserting the conductive wire 4 into the winding groove 24 that is closest to the base portion 22, on the side surface of the winding frame portion 21 of the insulator 2.

Figure 6:
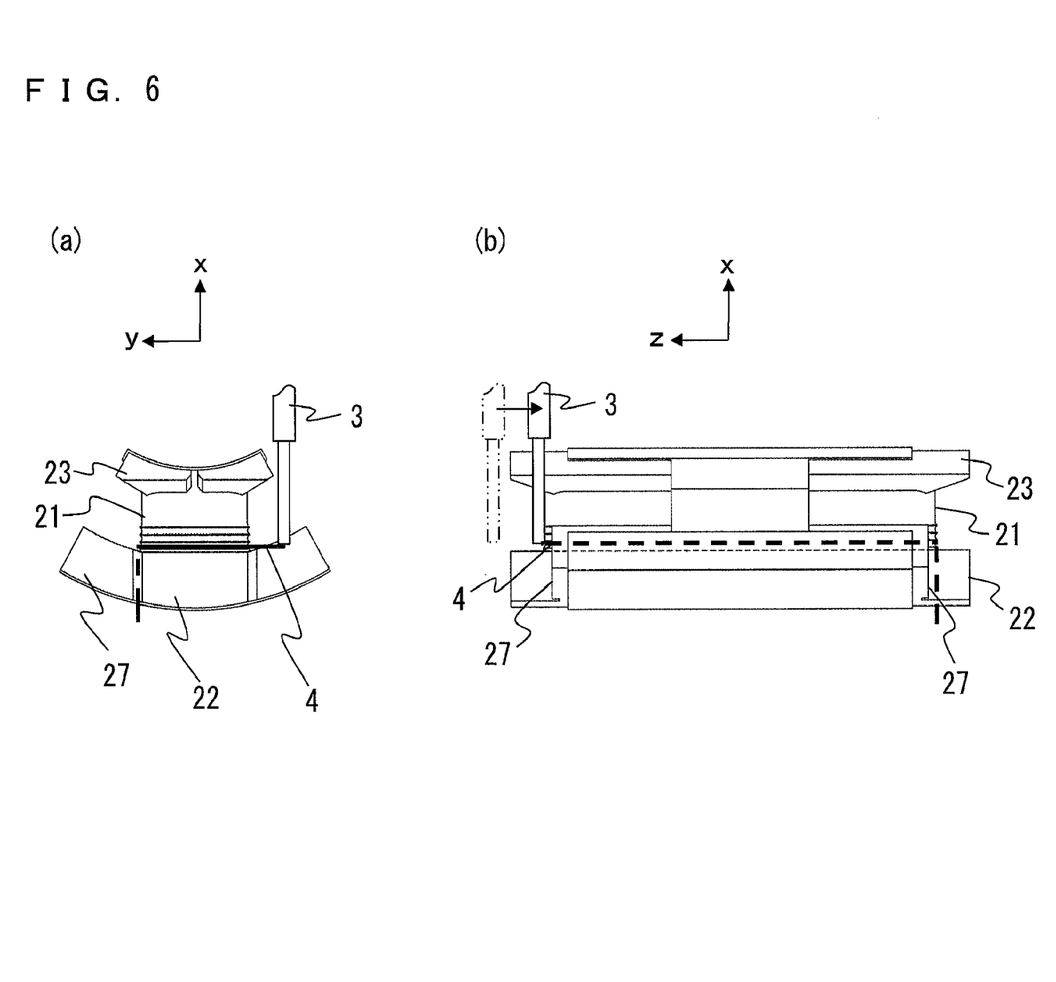
FIG. 6 is a diagram for explaining the core winding method according to embodiment 1 of the present invention.

Next, as shown in FIG. 6, the nozzle 3 is moved in the negative direction of the z axis so that the conductive wire 4 is inserted into the winding groove 24 of the winding frame portion 21 of the insulator 2. Here, the concave portion 27 for nozzle interference prevention is provided on the insulator 2 in order to prevent the nozzle 3 from interfering with the insulator 2. The end surface of the concave portion 27 is closer to the core side than the end surface of the winding frame portion 21 in the positive direction of the z axis.

Figure 7:
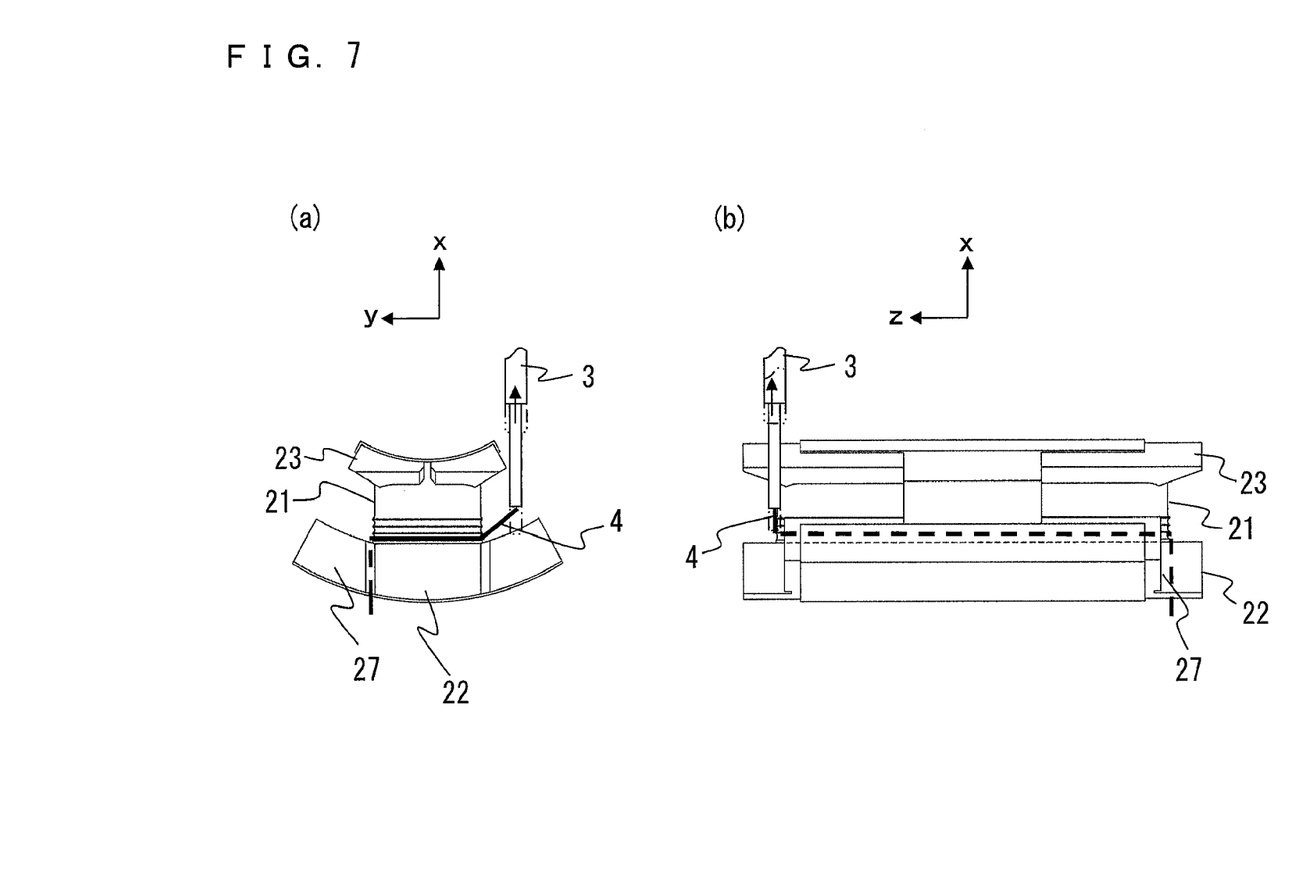
FIG. 7 is a diagram for explaining the core winding method according to embodiment 1 of the present invention.

Next, as shown in FIG. 7, the nozzle 3 is moved to a position where the nozzle 3 will not interfere with the divided-type core 1 and the insulator 2 when the nozzle 3 is moved to the insulator 2 on the negative direction side of the z axis, along the side surface of the divided-type core 1. That is, the nozzle 3 is moved toward the tooth end portion side with reference to the chord of the bow-like area 14. At this time, the wire on the winding frame portion 21 of the insulator 2 has been already inserted into the winding groove 24 of the winding frame portion 21, whereby the wire keeps being retained at the certain position.

In FIGS. 3 to 7, as seen from the front of the tooth portion 11, the yoke portion 12, and the tooth end portion 13, the nozzle 3 draws a convex-shaped trajectory proceeding from the tooth end portion side toward the yoke portion side with reference to the position of the chord of the bow-like area 14.

Figure 8:
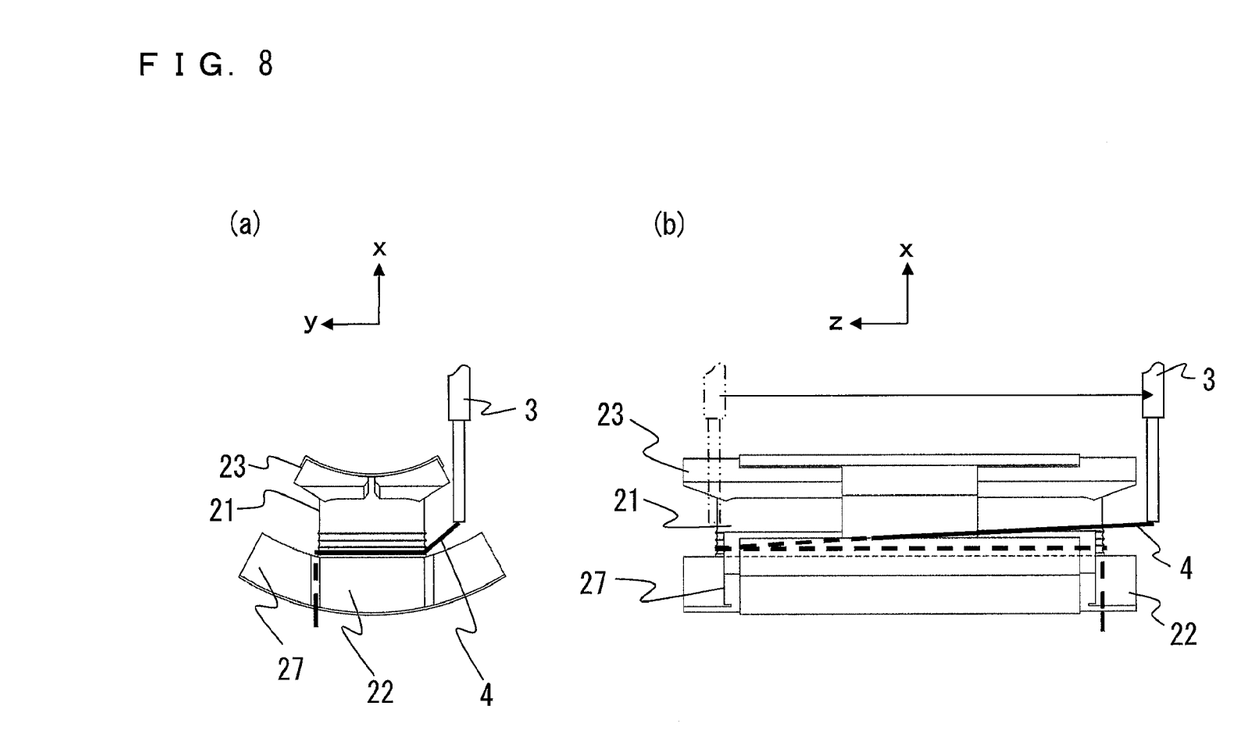
FIG. 8 is a diagram for explaining the core winding method according to embodiment 1 of the present invention.

Next, as shown in FIG. 8, the nozzle 3 is moved linearly to the first end surface side of the insulator 2 on the negative direction side of the z axis, along the side surface of the divided-type core 1.

The conductive wire 4 is also wound on the insulator 2 on the negative direction side of the z axis, in the same manner as described above. Through repetition of the above process, the conductive wire 4 is wound in an aligned manner toward the winding frame end portion 23 side of the insulator 2.

It is noted that when the wire is wound on the winding frame portion 21 in an area other than the bow-like area 14 of the insulator 2, the movement of the nozzle 3 along the convex-shaped trajectory in FIGS. 4 to 7 described above may be omitted, so that the nozzle 3 may be moved linearly in the negative direction of the y axis from the position shown in FIG. 3 to the position shown in FIG. 7.

In addition, after the wire is wound up to the vicinity of the winding frame end portion 23 of the insulator 2 whereby winding for the first layer has been completed, winding for the second layer is started toward the base portion 22 side of the insulator 2. Then, when the wire is wound again in the bow-like area 14, the wire in the first layer serves as the winding grooves of the insulator. Therefore, the wire can be wound in an aligned manner as in the first layer, by the winding method shown in FIGS. 2 to 8 described above.

Figure 9:
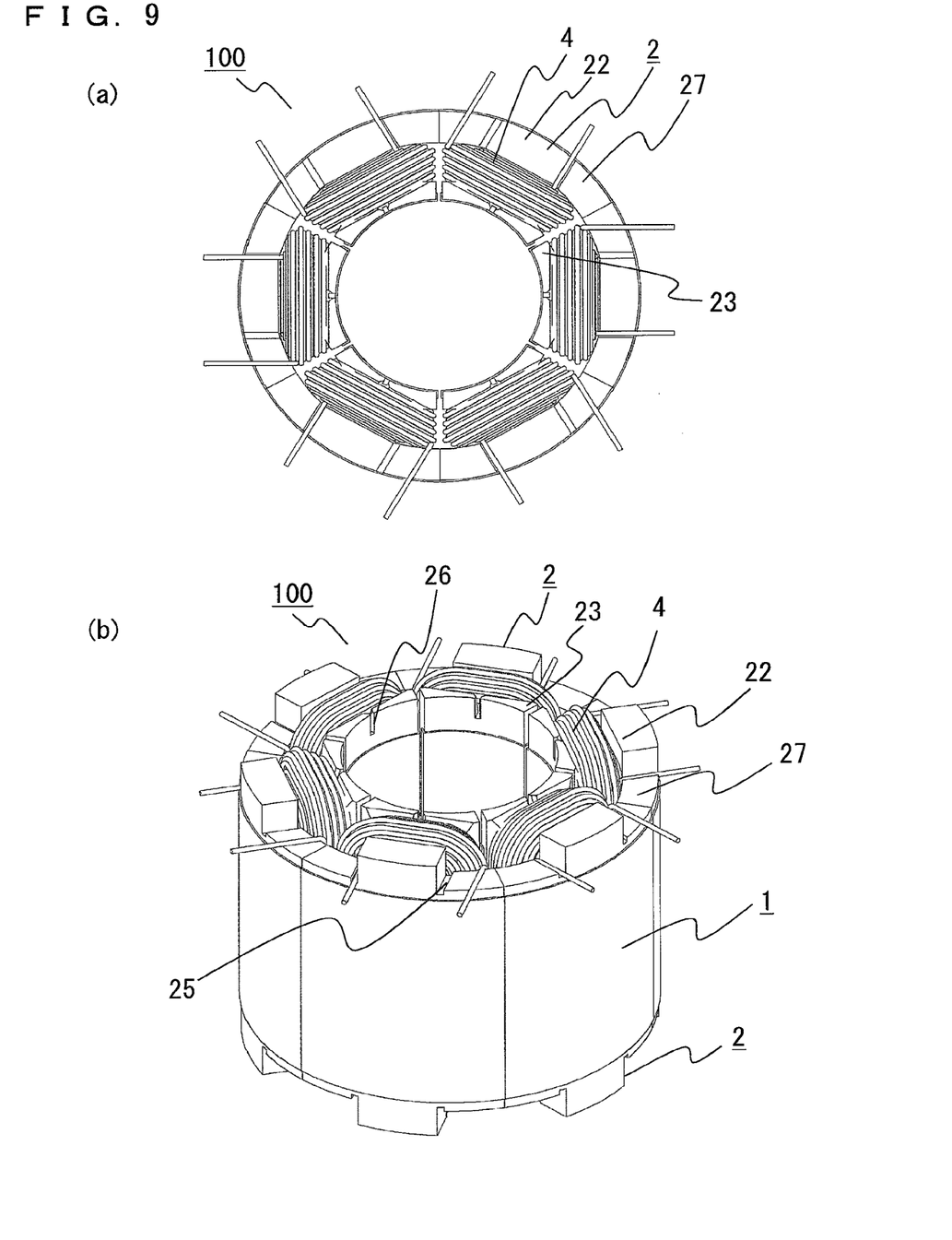
FIG. 9 is a diagram showing a stator manufactured in an embodiment of the present invention.

FIGS. 9(a) and 9(b) are a front view and a perspective view showing a stator formed by combining, in a circular shape, the divided-type cores wound by the above winding method.

In FIG. 9, the insulator 2 having: the winding frame portion 21 positioned on an end surface of the tooth portion 11; the base portion 22 positioned on an end surface of the yoke portion 12 and provided with the concave portion 27 on its both sides in the circumferential direction, the concave portion 27 being positioned on the end surface side of the core relative to the end surface of the winding frame portion 21; and the winding frame end portion 23 positioned on an end surface of the tooth end portion 13, is attached on the divided-type core 1 having: the arch-like yoke portion 12; the tooth portion 11 protruding radially inward from the center portion of the yoke portion 12; and the tooth end portion 13 connected to the end of the tooth portion 11. The conductive wire 4 is wound in an aligned manner on the winding frame portion 21 including the bow-like area 14 of the insulator. Then, a plurality of divided-type cores 1 thus wound in an aligned manner are combined in a circular shape while both end surfaces of the yoke portions in the circumferential direction are made into contact with each other, whereby a stator 100 is formed.

As described above, according to the present embodiment, it is possible to wind a conductive wire in an aligned manner in the bow-like area of a core having an arch-like yoke portion by using a general-purpose winding machine that moves a nozzle in x-axis, y-axis, and z-axis directions orthogonal to each other. Therefore, the number of turns of the conductive winding and the occupancy of the conductive winding can be increased, and the facility cost for winding can be suppressed.

In addition, since the needed operation range of the nozzle is small, winding can be performed without interference between the nozzle and the core even in the case of a joined-type core or an integrated-type core, thus realizing increased versatility.

Further, in the case of winding a wire continuously, the length of a jumper wire can be minimized, whereby the number of assembly steps can be suppressed.

Embodiment 2

FIGS. 10 to 13 are diagrams explaining a core winding method according to embodiment 2 of the present invention. In embodiment 1, winding is started from the base portion side of the insulator. In the present embodiment, the case of starting winding from the winding frame end portion side of the insulator will be described. It is noted that the structures of the divided-type iron core and the insulator are the same as those of embodiment 1, and therefore the description thereof is omitted.

Figure 10:
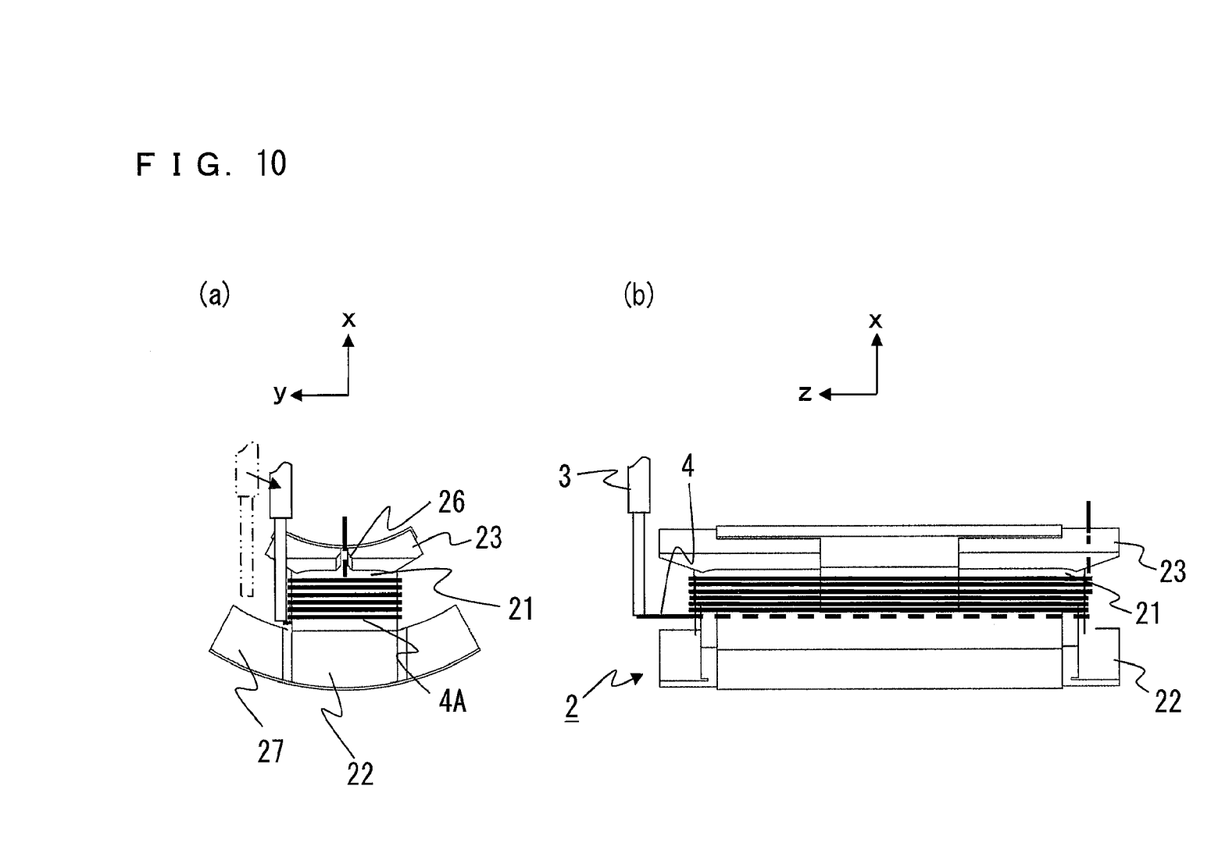
FIG. 10 is a diagram for explaining a core winding method according to embodiment 2 of the present invention.
Figure 11:
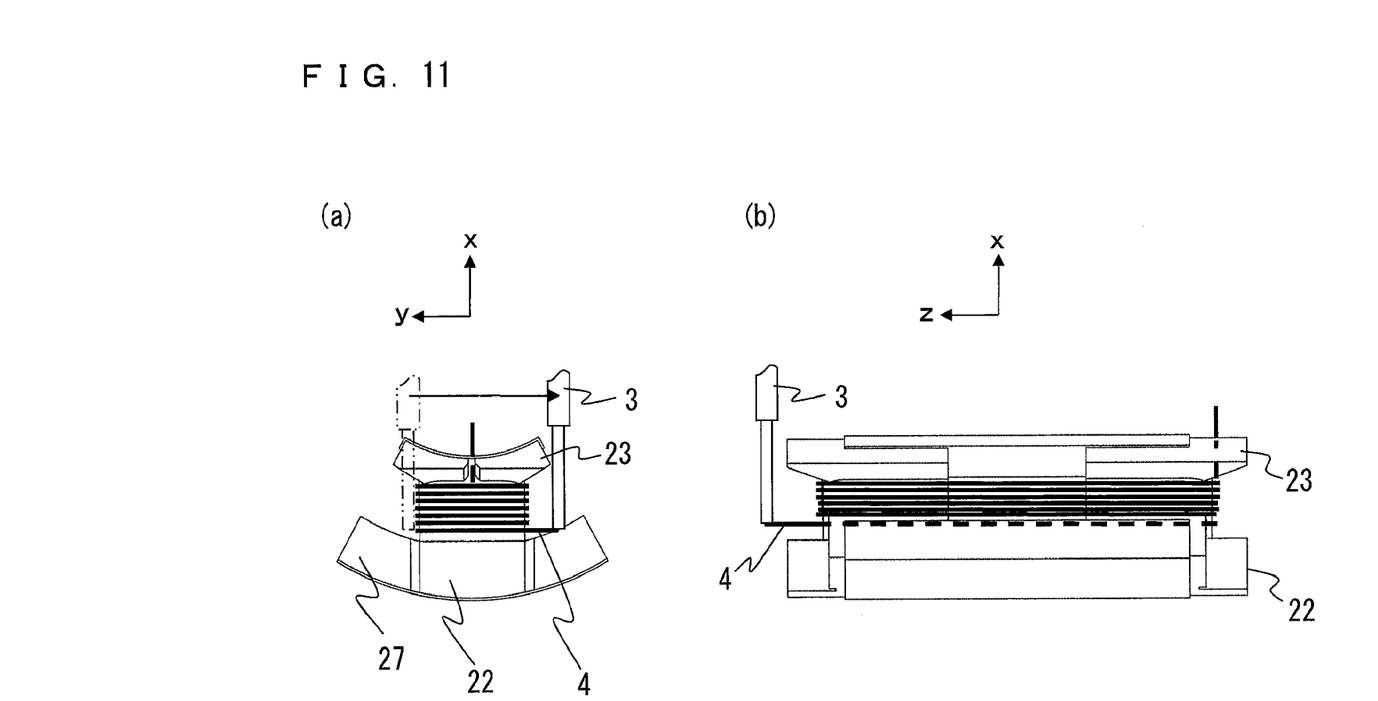
FIG. 11 is a diagram for explaining the core winding method according to embodiment 2 of the present invention.
Figure 12:
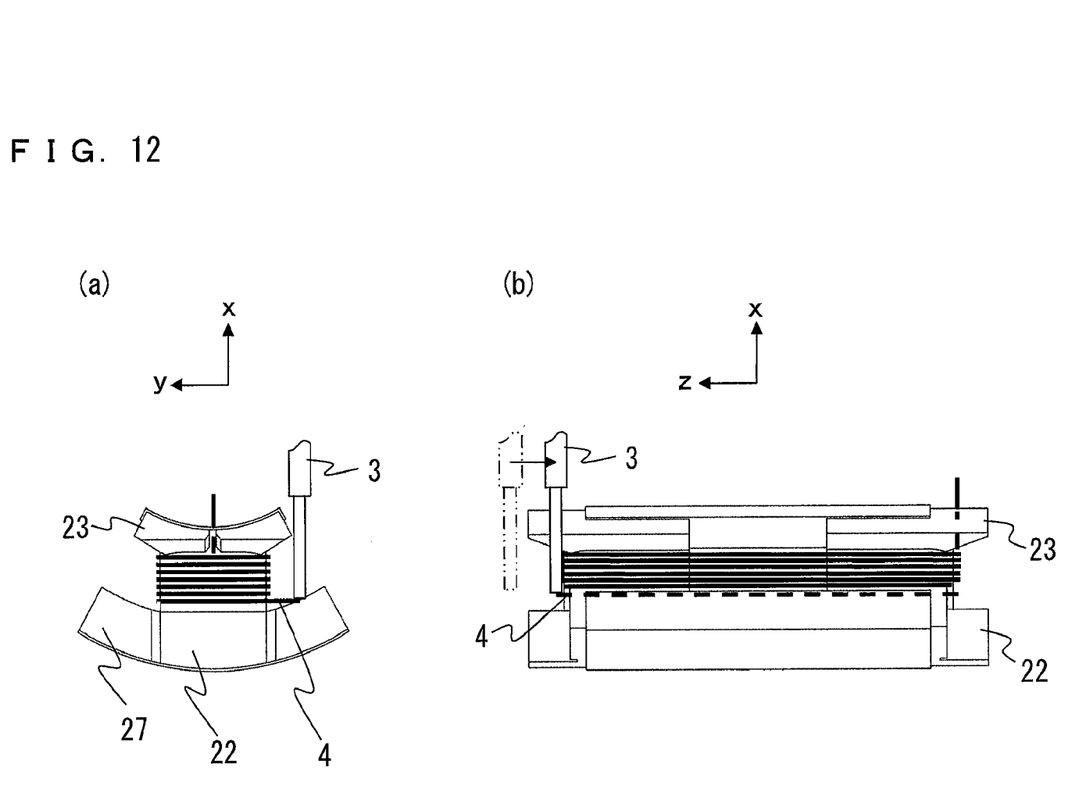
FIG. 12 is a diagram for explaining the core winding method according to embodiment 2 of the present invention.
Figure 13:
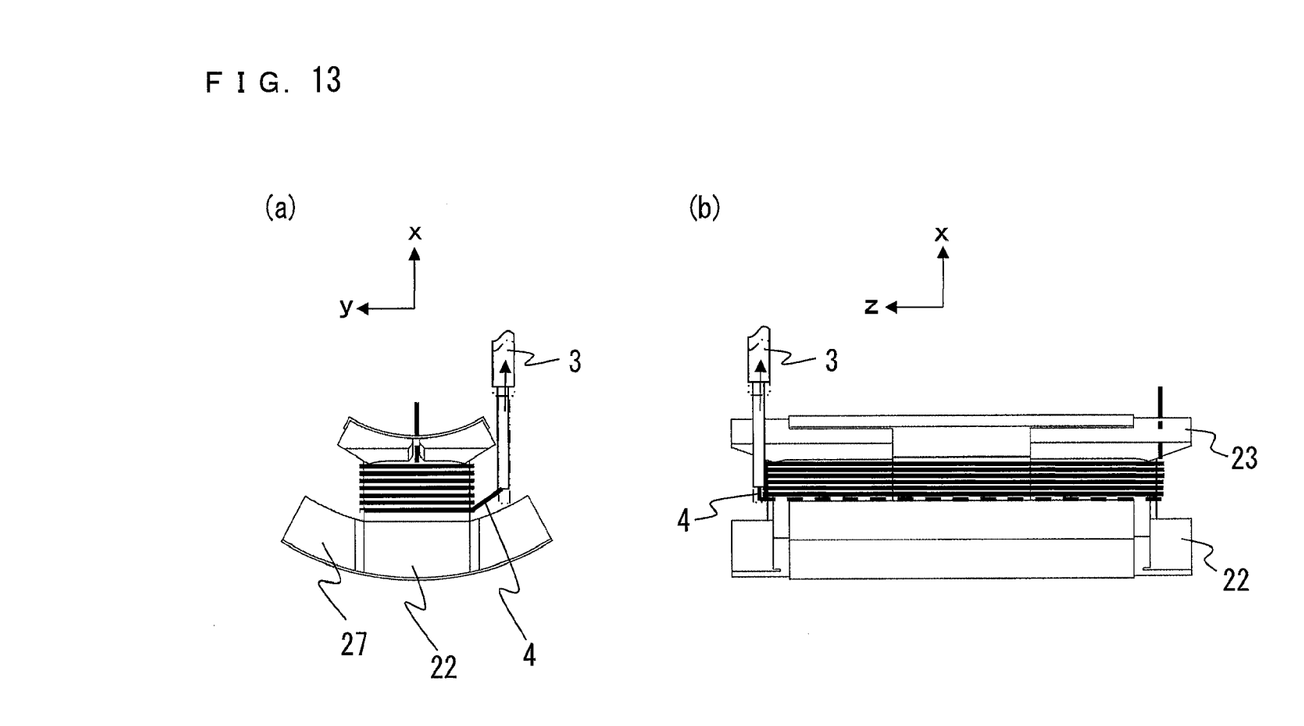
FIG. 13 is a diagram for explaining the core winding method according to embodiment 2 of the present invention.

First, an end portion of the conductive wire 4 fed from the nozzle 3 is passed through the winding frame end portion side guide groove 26 of the insulator 2, and then the end portion of the conductive wire 4 is held by a chuck device not shown.

Then, the nozzle 3 is revolved along the end surface and the side surface of the divided-type core 1, whereby the conductive wire 4 is wound on the winding frame portion 21 of the insulator 2 from the winding frame end portion side to the base portion side.

Next, when winding is performed in the bow-like area 14 surrounded by the arc of the inner circumference of the yoke portion 12 and the chord connecting both ends of the arc, as shown in FIGS. 10 to 13, as seen from the front of the tooth portion 11, the yoke portion 12, and the tooth end portion 13, the nozzle 3 draws a convex-shaped trajectory proceeding from the tooth end portion side to the yoke portion side with reference to the chord of the bow-like area 14. The above process is the same as that shown in FIGS. 4 to 7 of embodiment 1.

In the present embodiment, the winding grooves 24 are not provided on the winding frame portion 21 of the insulator 2, unlike embodiment 1. However, since a winding step 4A is formed by the conductive wire 4 having been already placed, winding can be performed by hooking the conductive wire 4 on the winding step 4A, without providing the winding grooves.

As described above, according to the present embodiment, the same effect as in embodiment 1 can be obtained, and further, winding can be performed using an insulator having no winding groove.

INDUSTRIAL APPLICABILITY

The core winding method of the present invention is applicable to not only a divided-type core but also a joined-type core and an integrated-type core. Further, according to the stator of the present invention, a stator having an increased number of turns of a conductive winding and an increased occupancy of a conductive winding can be obtained.

The invention claimed is:

1. A core winding method for, by revolving a nozzle for feeding a conductive wire, winding the conductive wire on a core having: an arch-like yoke portion; a tooth portion protruding radially inward from the center portion of the yoke portion; and a tooth end portion connected to the end of the tooth portion, the core winding method comprising the steps of, in the case of performing winding in a bow-like area surrounded by an arc of the inner circumference of the yoke portion and a chord of the arc:
   upon winding on an end surface of the core, winding the conductive wire by moving the nozzle so as to draw a convex-shaped trajectory proceeding from the tooth end portion side toward the yoke portion side with reference to the chord of the bow-like area; and
   upon winding on a side surface of the core, winding the conductive wire by returning the nozzle from the yoke portion side to the tooth end portion side with reference to the chord of the bow-like area, and then moving the nozzle along the side surface of the core.

2. The core winding method according to claim 1, wherein the conductive wire is wound on the core on which an insulator has been attached, the insulator having: a winding frame portion positioned at least on an end surface of the tooth portion; a base portion which is positioned at least on an end surface of the yoke portion and whose end surfaces on both sides in the circumferential direction are positioned on the end surface side of the core relative to the end surface of the winding frame portion; and a winding frame end portion positioned at least on an end surface of the tooth end portion.

3. The core winding method according to claim 1, wherein the core is provided with an insulator having: a base portion positioned at least on an end surface of the yoke portion; a winding frame portion positioned at least on an end surface of the tooth portion and having at least one groove for fixing the position of the conductive wire in a bow-like area surrounded by an arc of the inner circumference of the base portion and a chord of the arc; and a winding frame end portion positioned at least on an end surface of the tooth end portion, and
winding of the conductive wire is started from the base portion side toward the winding frame end portion side of the insulator.

4. The core winding method according to claim 1, wherein the core is provided with an insulator having: a base portion positioned at least on an end surface of the yoke portion; a winding frame portion positioned at least on an end surface of the tooth portion; and a winding frame end portion positioned at least on an end surface of the tooth end portion, and
winding of the conductive wire is started from the winding frame end portion side toward the base portion side of the insulator.

5. A stator formed by winding a conductive wire on a core on which an insulator has been attached and combining a plurality of the cores in a circular shape, wherein
the core has: an arch-like yoke portion; a tooth portion protruding radially inward from the center portion of the yoke portion; and a tooth end portion connected to the end of the tooth portion,
the insulator has: a winding frame portion positioned at least on an end surface of the tooth portion; a base portion which is positioned at least on an end surface of the yoke portion and whose end surfaces on both sides in the circumferential direction are positioned on the end surface side of the core relative to the end surface of the winding frame portion; and a winding frame end portion positioned at least on an end surface of the tooth end portion, and
the conductive wire is wound at least in a bow-like area surrounded by an arc of the inner circumference of the base portion and a chord of the arc on the core and the winding frame portion of the insulator.

6. The stator according to claim 5, wherein the base portion of the insulator has a base portion side guide groove for guiding the conductive wire at the start of winding.

7. The stator according to claim 5, wherein the winding frame end portion of the insulator has a winding frame end portion side guide groove for guiding the conductive wire at the start of winding.

8. A stator formed by winding a conductive wire on a core on which an insulator has been attached and combining a plurality of the cores in a circular shape, wherein
the core has: an arch-like yoke portion; a tooth portion protruding radially inward from the center portion of the yoke portion; and a tooth end portion connected to the end of the tooth portion, the insulator has: a base portion positioned at least on an end surface of the yoke portion; a winding frame portion positioned at least on an end surface of the tooth portion and having at least one groove for fixing the position of the conductive wire in a bow-like area surrounded by an arc of the inner circumference of the base portion and a chord of the arc; and a winding frame end portion positioned at least on an end surface of the tooth end portion, and the conductive wire is wound at least in the bow-like area on the core and the winding frame portion of the insulator.

9. The stator according to claim 8, wherein the base portion of the insulator has a base portion side guide groove for guiding the conductive wire at the start of winding.

* * * * *